Feb. 5, 1963

C. JASPER 3,076,931

APPARATUS FOR IDENTIFYING AND PHASING
ELECTRICAL CONDUCTORS

Filed Dec. 23, 1959

INVENTOR.
CRONJE JASPER

BY *Brown, Jackson, Boettcher & Dienner*

ATTYS.

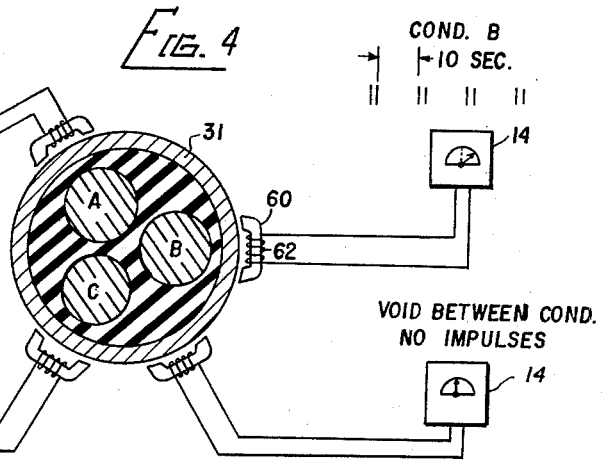
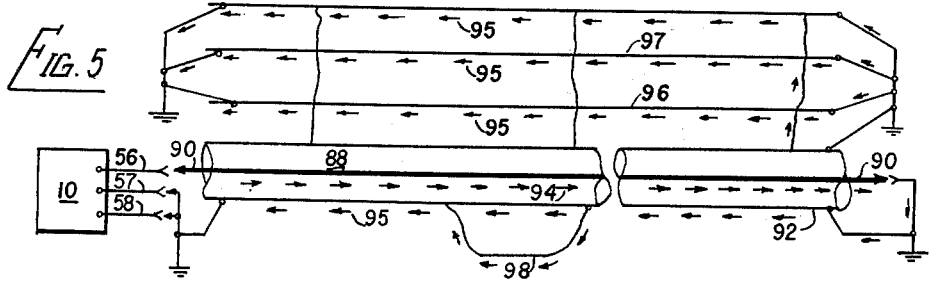
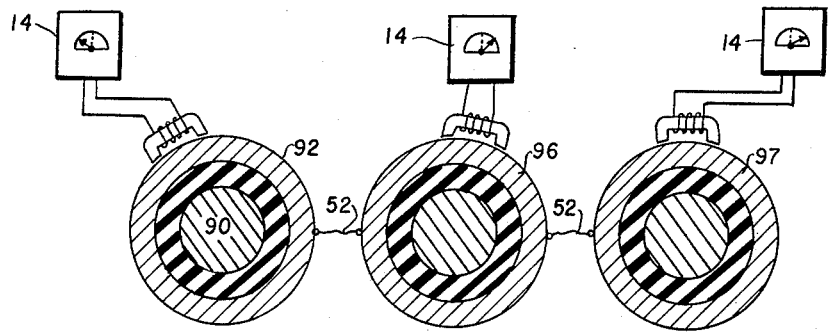

United States Patent Office 3,076,931
Patented Feb. 5, 1963

3,076,931
APPARATUS FOR IDENTIFYING AND PHASING ELECTRICAL CONDUCTORS
Cronje Jasper, 135 S. Wisconsin Ave., Villa Park, Ill.
Filed Dec. 23, 1959, Ser. No. 861,516
15 Claims. (Cl. 324—66)

The present invention relates to a novel method and apparatus for identifying an electrical cable in a group of cables, and particularly to a novel method and apparatus for simultaneously effecting both the identification of a multi-conductor electrical cable and the phasing of the conductors of such cable.

In a typical distribution system for extending power from a generating station to a user, the system will frequently include a subtransmission circuit which delivers the energy from the generating station to a distribution substation in the form of three phase circuit at between 13 and 66 kv., and the equipment at the substation, in turn, converts the electrical energy to a lower voltage for electrical distribution to the user. In other systems, the energy may be transmitted from the substation over primary circuits or feeders, which operate between 2.4 and 13.5 kv. to distribution transformers or other similar type units, which convert the power to lower voltages for extension over secondary mains and over service drops to the consumer service switch. In the extension of the three-phase alternating current electricity over at least certain portions of such systems, and particularly over the underground portions of the system, it is conventional practice to use sheathed or insulated cables. Such cables are conventionally classed as single conductor, two conductor, three conductor, etc., cables according ot the number of separately insulated conductors which are enclosed by the single lead sheath.

It is frequently necessary in a system which includes electrical current-carrying cables of such type to open or cut the cable for construction, repair or maintenance purposes, and it is manifestly apparent that in a system in which an extremely large number of such cables are located in adjacent, closely grouped relation, utmost caution must be exercised in determining that the one of the cables which is to be interrupted is the one of the cables for which the electrical power has been interrupted at the terminal end. That is, inaccurate identification of a cable of such type (which may be carrying 2200 volts and above), presents the possibility of cutting into an energized cable, and the possibilty of electrical shock and burns to the workmen as well as costly repairs and outages of equipment. It is further apparent that in the interest of safety, the cable must be properly identified to prevent the inadvertent application of power to the cable during the period that the men are working on the exposed conductor ends of the cable.

In addition to effecting the proper identification of the cable, it is also frequently necessary to carefully determine the phase of the different conductors prior to splicing of the cable conductors, in that it is not uncommon for an inaccurate phasing of the conductor to result in costly rebuilding and equipment outages and in certain instances, danger to human life.

It is a primary object of the present invention, therefore, to provide a novel method and apparatus for effecting cable identification and conductor phasing with a maximum of reliability under all conditions of operation.

The problem of cable identification and conductor phasing is well known in the field, and various methods of identification have been practiced heretofore in an effort to advance such art. However, each of the methods known heretofore have inherently included some basic shortcoming which, for the most part, has interfered with the reliability of the identification and phasing operations. One of the better known methods, for example, consists of using a transmitter which imposes a tone signal at one end of the cable for transmission along one conductor and the return thereof over the lead sheath of another cable. At the work location a pick-up coil or earphone is placed in the magnetic field of the current in the cable to thus detect the particular one of the cables which is conducting the tone. In the use of such equipment, however, the signal on the sheath may be louder on an adjacent cable than the signal which is provided by the current flow in the conductor of the cable to be identified, and since the interpretation of the signal is dependent upon the loudness of the tone which is detected, it is possible to make a false interpretation of the signal.

In addition to the serious nature of the problem of accurately identifying a cable prior to the initiation of work thereon, there is the further problem of phasing the conductors of a cable subsequent to identification. That is, following opening or cutting of the cable and the necessary work thereon, the conductor ends are prepared for splicing, and during such operation it is necessary to stop the splicing work for the purpose of phasing the conductors to insure the proper connection thereof. According to one method practiced in the field, an operator is located at each terminal and by a predetermined system of signals placed on the conductors by the operator, the workman at the location utilizes a lamp bulb connected in series with a source of direct current supply to determine the phase identity of each conductor by touching the light bulb between each of the conductors and ground and observing the signal which is received thereover.

The disadvantages of the lamp or direct current signal method include the need to have the insulation removed from the conductors at the receiving end which necessitates a phasing operation in the middle of the joining work; the need for the operators to return to the terminals to indicate the phase; the delay of the work of the splicing crews during the phasing operations; the increase in the number of switching operations and therefore the possibility of operating errors; and the need to effect the switching operation with exposed conductors in the presence of workmen in the manhole. In the use of such system on the portion of a distribution system which includes network feeders, it is further necessary to disconnect all transformers from the cable terminals, and such operation in itself becomes extremely time consuming and costly. The direct current signal method of identification is therefore only moderately efficient and reliable in its use.

Other known signalling and detection methods include the use of records, communication with the aid of telephones, polarized grounding of the different phases in a different manner and impulse phasing. These and other methods have also proven to be less than satisfactory in use, and there accordingly remains a definite need for a new and novel apparatus or method for effecting cable identification and conductor phasing in a more reliable and expeditious manner. It is a particular object of the present invention therefore to provide a novel method and apparatus which is operative to both identify the desired cable and to phase the individual conductors in a single operation prior to cutting of the cable, whereby such operation is accomplished in a more safe and versatile manner than has been heretofore possible with known types of equipment.

It is a further object of the invention to provide an apparatus and method which is extremely flexible in its operation whereby the unit may be utilized with current carrying conductors in different fields, and which is particularly useful by reason of the relatively small number of operations which are required by the user.

It is another object of the invention to provide a novel apparatus which utilizes a condenser discharge surge generator and associated detector to permit a more simplified manner of identification, and thereby the minimization of training of personnel in the use thereof. It is an additional object of the invention to provide a device which is operable in such manner, and which is of extremely small size and weight to thereby permit ready operability in the field and more flexible application and use of the device.

According to the invention, the novel apparatus for effecting the simultaneous identification of the cable and phasing of the conductors thereof basically comprises a transmitter device including means for generating and coupling impulses over the three conductors according to a predetermined code, the code for different conductors being different, and a detector device including an exploring coil which is rotated around the cable until the maximum deflections or field are indicated, the maximum deflections which occur indicating the location of the different conductors, and the code of the impulses which occur on the associated meter indicating the phase of the conductor.

In one embodiment, the pattern of coded impulses utilized included the transmission of impulses repetitively over the phase A conductor at two second intervals; the transmission over the phase B conductor of a set of two impulses spaced at two second intervals, which set is repeated after each ten second pause; and the transmission over the phase C conductor of a set of four impulses spaced at two second intervals, which set is repeated after each six seconds. The direction of impulse transmission for the phase B and C conductors was different than the direction of transmission over the A phase conductor to additionally provide a deflection on the indicator meter for the B and C phases which is directionally different from the deflection for the phase A conductor.

In operation, an operator connects the transmitter leads to the cable terminals at the transmission end according to the phase markings thereat to effect the transmission of the coded pulses over the conductors and an operator at the work location explores the different points about the periphery of the cable to locate the maximum fields to determine the conductor locations, and the coded pattern of each field to determine the phase thereof.

According to a feature of the invention, the novel equipment is also operative to provide positive identification of phases on buried concentric cable. In such arrangement, when the transmitter is connected phase to ground, positive identification is obtained by installing a heavy electrical jumper across a section of the cable sheath and placing the explorer coil between the jumper and the cable. In such manner of connection the return signal impulses are divided and their effect is cancelled relative to the detector equipment, whereby the detector registers only the impulses which are extended over the conductor, the direction of the impulses providing positive identification of the phases. Such manner of jumpering the coil can be used on any single conductor cable with a metallic sheath and constitutes the only known method which will positively identify concentric cable with other phases in service.

These and other advantages and features of the invention will become apparent with reference to the following specification, claims and drawings in which:

FIGURE 1 sets forth a schematic diagram of the novel cable and phase identifier in its connection to a three conductor cable for use in a cable and phase identification operation and the pattern of impulses which occurs in each of the conductors;

FIGURE 4 is a cross-sectional view of the three conductor cable showing the manner in which detection of the different cables is effected by adjustment of the indicator to different positions about the periphery of the cable;

FIGURE 5 sets forth a diagram of a single conductor cable as identified by transmission of signals over parallel cable sheaths; and FIGURE 6 constitutes a cross-sectional view of a single conductor cable and the sheath of paralleling cables which are used in the test arrangements of FIGURE 5.

*General Description*

Figure 1:
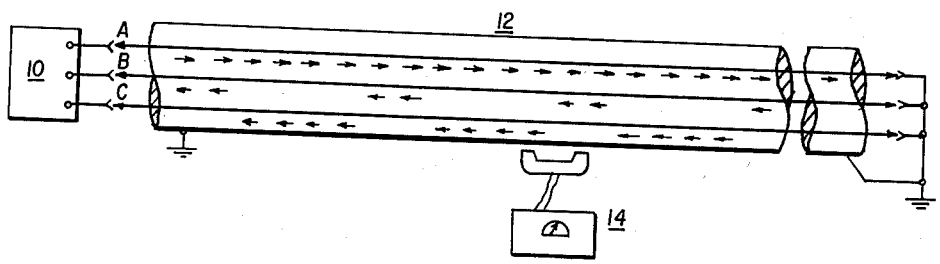

With reference to FIGURE 1, the arrangement thereshown indicates schematically the manner in which the novel apparatus including a transmitter 10 is connected to conductors A, B, and C of a multiconductor sheath cable 12 with the distant ends of the conductor short circuited or grounded, and a detector device 14 is located at a point along the conductor length at which the identification of the conductor and the phasing of the conductor cables is to be effected.

The arrows adjacent conductor A indicate the flow of the pulses which are coupled to conductor A by transmitter 10, and are schematically representative of the relative number of pulses and relative times of transmission of the pulses over each conductor. In one specific embodiment disclosed herein an impulse is transmitted over conductor A every two seconds, and the arrows of FIGURE 1 on conductor A represent such condition. The arrows adjacent conductor B indicate in a similar manner the pattern and code of impulses which are returned over conductor B, the arrows being indicative of a plurality of sets of impulses, each of which set is comprised of two impulses spaced at two second intervals, and each set being spaced at ten second intervals. The arrows adjacent conductor C are indicative of the impulses which are returned over conductor C, and in the specific embodiment disclosed herein are representative of a plurality of sets of impulses, each of which sets comprises four impulses spaced at two second intervals, the sets being spaced at six second intervals.

It is apparent that each of the three conductors has impulses transmitted thereover according to a different code. Additionally, the direction of transmission of the impulses over conductor A is different than that of the direction of transmission impulses over conductors B and C, and a difference in the field directions may be detected in addition to the difference in codes.

Figure 2:
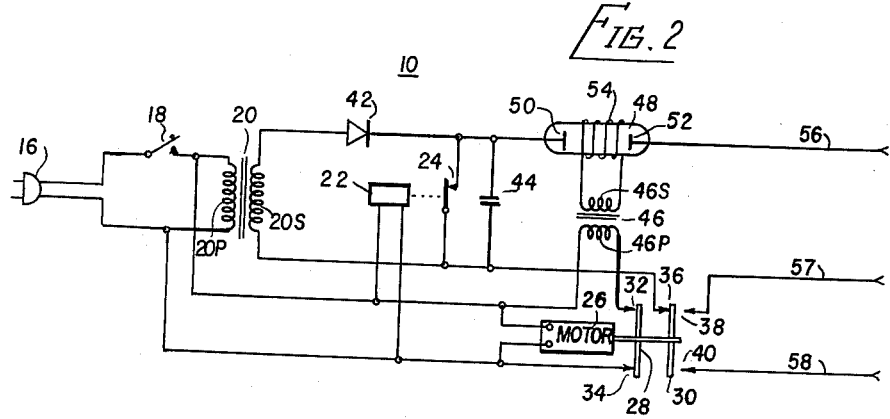
FIGURE 2 is a detailed schematic illustration of the transmitter apparatus used in the identifier unit shown in FIGURE 1.
Figure 3:
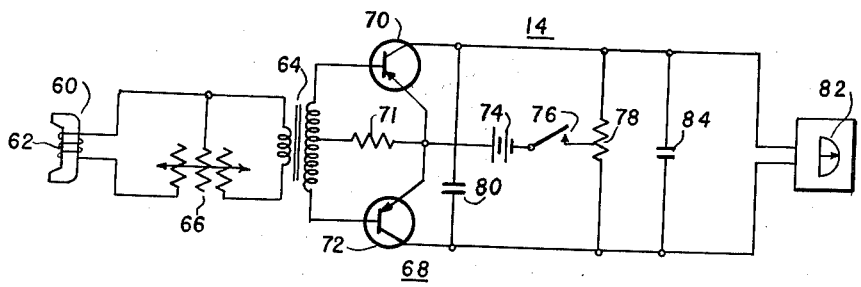
FIGURE 3 is a detailed schematic illustration of the detection apparatus used in the identifier unit of FIGURE 1.

With reference to FIGURES 2 and 3, the specific structures of a transmitter and detector apparatus of the type which may be used in the provision and detection of the coded impulses and fields is shown thereat. More specifically, transmitter 10 basically comprises a power coupling circuit 16, which may consist of a line plug for connecting the transmitter to a source of 110 volt A.C. supply, and a control switch 18 for completing an operating circuit for (a) a transformer 20 comprised of a primary and secondary winding 20P, 20S, (b) a relay member 22 having a set of associated contacts 24, and (c) a motor 26 which controls a rotary switch 28 and 30 in the operation of a first set of contact members 32, 34, and a second set of contacts 36, 38 and 40.

The relay 22 and transformer 20 control energization of a potential storage device or capacitor 44. Relay 22 is connected to power source by switch 18, and a set of normally closed contacts 24 on relay 22 are connected to normally complete a shunt circuit for capacitor 44. The primary winding of transformer 20 is coupled to the power source by switch 18, and the secondary winding 20S is coupled with selenium rectifier 42 in a charging circuit for capacitor 44. As switch 18 is closed relay 22 operates and at its contacts 24 interrupts the shunt path for capacitor 44, and the transformer 20 effects charging of capacitor 44 over the charging circuit.

The charge on capacitor 44 is periodically coupled to the A phase conductor in a cyclic manner to establish timed impulses on the A phase conductor, the pulse generating circuit including motor 26, selector switch 28, transformer 46 and control tube 48. Motor 26 is connected to the power source by switch 18, and the shaft of motor 26 is coupled to selector switch 28 to cyclically rotate same and thereby cyclically open and close a pair of contacts 32, 34 to effect the pulsing of an energizing circuit for a control tube 48, the energizing circuit extending from source 16 over one side of the line to control switch 18, the primary winding 46P of transformer 46, selector contacts 32, 34 and back over the other side of the line to the source 16. The secondary winding 46S of transformer 46 is connected to the control winding 54 of a gas filled control tube 48, which includes a pair of electrodes 50, 52 connected to provide a control path for connecting capacitor 44 to conductor 56 in a periodic manner.

Motor unit 26 is also operative to control a selector switch 30 which at its contacts 36, 38 and 40 is operative to provide, in a time division manner, the alternate connection of the phase B conductor and the phase C conductor to the capacitor 44 to complete the discharge or return path for the pulses which are transmitted over the phase A conductor by the pulsating control tube 54. With reference to FIGURE 1, it will be apparent that in the specific embodiment shown therein, the selector switch 30 controls the contacts 38 to connect the B phase conductor to capacitor 44 for the period of the first two impulses, which are coupled to conductor A by control tube 54, and the contacts 40 to connect the C phase conductor to capacitor 44 for the period of the next four impulses, such manner of connection being repeated in a cyclic manner during the period of operation of motor 26 whereby the pulse pattern indicated in FIGURE 1 is achieved over the conductors A, B and C.

Briefly, in operation with the transmitter plugged into a source of 110 volt A.C. supply, and the output conductors 56, 57, 58 of the transmitter coupled to phase conductors A, B, C, respectively, the operator closes the control switch 18 and relay 22 operates to open contacts 24 and to disable the short circuit for capacitor 44 to permit the charging thereof. The primary winding of transformer 20 is energized and the secondary winding thereof couples a 1500 volt potential over selenium rectifier 42 to capacitor 44 which charges toward such value. Simultaneously, motor unit 26 operates to close contacts 32, 34, and thereby complete the energizing circuit for the primary winding of pulse transformer 46 from the source 16, which in turn couples a control voltage to the control winding 54 of control tube 48 to effect the triggering thereof. Control tube 48, as triggered, couples capacitor 44 in a circuit which extends from capacitor 44 over control tube 48, terminal 56, the A phase conductor, the connection of the conductor at the remote terminal end, and back over either the B or C phase conductor depending upon the position of contacts 38, 40 on selector switch 30, and over contacts 36 to the other side of the capacitor 44. Manifestly the circuit thus completed forms a discharge path for the charge on capacitor 44, and each discharge of the capacitor over such path appears as an impulse over the conductors A, B, C of the cable which are connected in the circuit.

As indicated above, the first selector switch 28 is operative at its contacts 32, 34 to control contactor tube 48 to discharge the capacitor to the phase A conductor at two second intervals in the present embodiment, and second selector switch 30 is operative at its contacts 36, 38 to connect the B phase conductor in the discharge or surge circuit for the period that the first two pulses are coupled to the phase A conductor, and is operative at its contacts 36, 40 to include the phase C conductor in the surge circuit for the period that the next four impulses are coupled over phase A conductor.

As shown in FIGURES 1 and 4, as a result of the alternate path completion by the selector switch 30, the coded impulse pattern will comprise a series of pulses on phase A conductor which are spaced by two second intervals; sets of two impulses each, which are spaced by ten seconds on the B phase conductor; and sets of four impulses each, which are spaced at six second intervals on the phase C conductor.

The detector unit 14 which is used in the detection of such signals to identify the cable and phase the cable conductors is set forth in more detail in FIGURE 3 and as there shown basically comprises an exploring coil 60 which is adapted to be placed adjacent the cable to be responsive to the electromagnetic field which is created by the flow of the currents through the cable conductors, and amplifier means 68 for coupling the detected signals to a meter device 82.

As shown in FIGURE 3 the coil unit 60 includes a winding 62 which is connected in series with the primary of a transformer 64 and a gain control unit 66 for controlling the value of the induced signal which is coupled to the primary winding of transformer 64 by coil 62. The secondary winding of transformer 64 is coupled to a push-pull transistorized amplifier circuit 68 which basically comprises a first and second transistor element 70, 72 connected in a conventional push-pull circuit arrangement. A battery source 74 provides the energizing power for the transistor devices 70, 72, the negative terminal thereof being connected over a control switch 76 and a resistance divider member 78 to the collector elements of the transistors 70, 72, and the positive terminal being connected over bias resistance 71 to a center tap on the secondary winding of transformer 64 and the base elements of transistors 70, 72. Emitter elements of transistors 70, 72 are connected common to the positive side of the battery. Capacitor 80 is connected across the collector output circuits of the transistors 70, 72, which are connected to an indicating meter 82. Capacitor member 84 is coupled across meter 82.

In operation, whenever the exploring coil 60 is placed adjacent the electromagnetic field which is created by the flow of current through one of the conductors, a current flow is induced in winding 62 of the coil which is coupled over the gain control unit 66 to the primary and secondary windings of transformer 64 for the base elements of the push-pull amplifier arrangement 70, 72 in amplifier unit 68. The direction of flow of the induced signal will, of course, vary with the direction of flow of the current through the conductor. Thus, in the event that the detector coil 60 is placed adjacent the phase A conductor, the current flow through the primary winding of transformer 64 will be in a first direction, and when the detector coil 60 is placed adjacent phase B conductor or phase C conductor, the current flow through the primary winding of transformer 64 will be in the opposite direction. Accordingly with the current flow in the one direction, one of transistors 70, 72 will be more conductive, and with the flow of the current in the opposite direction, the other of the transistors 70, 72 will be more conductive.

The output of the particular one of the transistors which is energized responsive to the signals which are coupled to the amplifier 68 is coupled to meter 82 which in its normal condition controls its associated needle to be disposed at a given zero point for deflection to the right and to the left thereat. With the detection of current flow in one direction in a conductor (conductor A in the present embodiment), the one transistor of the amplifier 68 will operate to effect deflection of the needle to the left of the center position by an amount which is related to the value of the field detected, and with the detection of the flow of current in the opposite direction in a conductor (conductors B and C in the present example) the other transistor of the pair in the amplifier circuit will be operative to provide a signal which effects deflection of the needle to the right of the center positon, the degree of deflection being related to the value of the field detected by the instrument. Thus the instrument, in addition to providing an indication of the location of the maximum field, also provides an indication of the direction of current flow in such conductor.

*Use of Cable and Phase Identifier Equipment*

In the use of the equipment for identifying the cable and phasing the conductors on multiple-conductor cables as noted above, the conductors A, B and C are short circuited and/or grounded at one terminal, and the transmitter unit 10 is connected to the other terminal with the conductors 56, 57, 58 connected respectively to the A, B, C, phase conductors. The control switch 18 is closed, and motor 26 controls selector switch 28 and tube 48 to couple impulses over the phase A conductor at two second intervals, and selector switch 30 to complete a return path for two of the impulses over the B phase cable, and a return path for the next four impulses over the C phase conductor, such pattern being repeated in a cyclic manner for the period that the control switch 18 is in the closed position.

At the work location, the cable is identified and phased by means of the detector device 14, and specifically by adjustment of the exploring coil 60 to various positions about the periphery of the different ones of the cables located at the point at which the work is to be accomplished. More specifically, the coil 60 is placed on the different cable sheaths until the meter deflects periodically to indicate the impulses on the cable conductors. Assuming that the coil is first placed adjacent conductor A of the cable which is to be identified with the arrow towards the transmitter electrically, as indicated in FIGURE 4, the needle on the meter 82 will deflect towards the left. The coil is next moved back and forth adjacent such position on the cable until maximum deflection of the needle is observed every two seconds, and at such time the coil will be directly over the center of the A phase conductor. The location and phase are then marked on the outside of the sheath.

The exploring coil 60 is now moved around the outer sheath of the cable until the next maximum deflection point is observed, the number of deflections determining the particular conductor which is located thereat. Thus, as shown in FIGURE 4, if there are two deflections repeating after every ten second interval, the coil will obviously be adjacent the B phase conductor, and the outside of the sheath is so marked. A further verification is provided on the meter 82 in that the needle deflections which now occur are in a direction which is opposite to that obtained when the exploring coil was placed adjacent the A phase conductor.

The coil 60 is then further moved about the periphery of the cable until the indicator locates the position at which maximum deflection of the needle occurs four times every six seconds (FIG. 4) in the direction of the needle deflections which were effected in response to the location of the coil adjacent the B phase conductor. Such phase is identified as the C conductor phase, and the outer sheath is so marked. It will be observed that when the cable is over a space or void between the conductors, no deflection will result (FIGURE 4).

It will be apparent from the foregoing description that the novel equipment effects a positive, reliable and expeditious phasing of the conductors prior to the time that the cable is cut for the necessary purpose whereby a more safe field operation is effected. Further in addition to phasing the conductors, the equipment provides a positive identification of the cable since it would be obviously impossible to obtain such pattern of signals from a cable which did not have the specific transmitter of the disclosure connected to one terminal end of the cable conductors. Further, since the signal impulses are clearly and positively indicated on an electrical meter a more reliable and expeditious method of cable detection and conductor phasing is provided.

*Operation of Device for Identification of Single Conductor Cable*

The novel device also has particular utility in the identification of a single conductor 88 (which may be one of three single conductors, each of which conducts one phase of a supply circuit) by differentiating between the signal on the inner conductor 90 and the return signal on the sheath 92 of the cable. With reference to FIGURE 5, in such arrangement, the remote end of the cable 88 is grounded, both the inner conductor 90 and the sheath 92 being connected to ground, as shown. The output terminal 56 of transmitter unit 10 is connected to one terminal end of inner conductor 90, and the output terminals 57, 58 of transmitter unit 10 are connected to ground. As a result of such connection, the current flow in conductor 90 will be in the direction indicated by arrows 94, and the return will be over the ground connection and cable sheath 92 as shown by arrows 95. In that the sheaths of the parallel conductors are electrically connected, as shown in FIGURE 6, the return current flow will also extend over the parallel sheaths 96, 97, etc.

In identifying single conductor cable at the work location the exploring coil 60 of the detector device 14 is placed adjacent a cable with the arrow pointing towards the transmitter electrically, and the impulse current in the conductor 90 will cause the meter 82 to deflect to the left when the detector coil is placed adjacent the one of the cables to which the transmitter is connected, the pulses causing the needle to deflect at two second intervals. When the coil is placed on the cable adjacent a parallel cable, such as 96, 97, which is carrying only the sheath or return current (arrows 95), the deflection of the needle on meter 82 will be to the right. Thus by connecting the transmitter 10 to each phase conductor in succession, the different phases may be successively detected and marked, and positive identification of the conductors is accomplished.

Normally the field established by the current in the inner conductor 90 will be stronger than the field established by the current on the sheath 92 of the cable, and the resultant deflection will be sufficient to indicate that the desired one of the cables has been located. However, if the sheath current is strong enough to neutralize the conductor current, a by-pass jumper 98 (FIGURE 5) may be connected across a short section of the sheath, and the exploring coil is placed on the cable between the ends of the jumper 98. Jumper 98 by-passes a major portion of the sheath current 95, and only the signal derived from conductor 90 is now registered on the meter 82. If the jumper procedure is used on a cable carrying only return or sheath current, there will be no deflection of the meter. In such manner, an even further margin of safety is introduced into the identification and phasing operation.

*Conclusion*

The novel device disclosed herein provides an apparatus which will accurately identify and phase any type of cable, and of importance, will effect such operation in a most safe and expeditious manner. The device is also extremely flexible in its application, the apparatus being useful in differentiating between three conductors of a cable before the metallic sheath or shielding is removed, and being also useful in differentiating between the conductor signal and the sheath signal to thereby permit single conductor identification.

The manner in which the cable and phase identifier device permits the combination of two separate essential operations into one operation materially eliminates man hours and work, and additionally minimizes the attendant hazards of electrical shock and burns to the workmen as well as damage to the cable which may result if the cables are not properly identified in such manner. The complete elimination of the phasing step as a separate operation, and as a by-product of the cable identification before the insulation on the cable conductors is disturbed at the splicing location, further minimizes the hazards commonly associated with such operation. Further, in the use of such type apparatus a safety ground may always be maintained at one or more of the terminals of the cable during the identifying, phasing and splicing operations.

Another phasing hazard is eliminated as a result of the elimination of one switching operation to "remove the grounds" for phasing, and one switching operation to restore the grounds at each cable terminal. Since any switching operation presents some hazard to operating personnel and to the system, the elimination of such steps is definitely in the interest of improved and more safe working conditions. It is further noted that the present arrangement does not require the use of a probe by the operator to promote phase sending operations as in some of the known types of phasing methods, and there is no switching after the splicing operation has been started and the conductor insulation has been disturbed, whereby additional safety features are inherent in the practice of the invention.

The arrangement further saves time and expense in the construction and maintenance of electrical cable lines in that it eliminates the time which is normally required in most known methods of phasing including the time required of the operator in the provision of the phasing information from the terminals; the operator's traveling time to the terminals when the terminals are unattended; the time normally required to disconnect and reconnect transformers (the device of the present invention being operative without the necessity of disconnecting transformers from the cable since the reactance of the transformer windings effectively prevents the transfer of impulse current from one conductor to another), and others.

The provision of the novel device which results in an improved form of switching in a more expeditious and safe manner is believed to constitute a definite improvement and advancement in the art. While a particular embodiment of the invention has been shown and described, it is apparent that modifications and alterations may be made, and it is intended in the appended claims to cover all such modifications and alterations as may fall within the true spirit and scope of the invention.

What is claimed is:

1. An apparatus for simultaneously identifying a multi-conductor cable including a plurality of phase conductors and phasing the different conductors thereof in a single operation at a test point intermediate a pair of reference locations spaced apart along said cable, the conductors being intercoupled at one of said reference locations, comprising signal means coupled to at least given ones of said conductors at the other of said reference locations for establishing a flow of impulses on each of said given conductors in a cyclic manner according to a predetermined code and thus establishing fields externally of the cable varying with the impulse flow on each of said given conductors, the code for each different one of said given conductors being different at least in time, and signal responsive means for locating the maximum fields established at different points about the cable periphery, including means for indicating the coded pulsing of each of said fields as located.

2. An apparatus for simultaneously identifying a multi-conductor cable including a plurality of phase conductors and phasing the different conductors thereof in a single operation at a test point intermediate a pair of reference locations spaced apart along said cable, the conductors being intercoupled at one of said reference locations, comprising signal generator means including a first switching means for controlling the generation of impulses in a given cyclic sequence, means for coupling said impulses to one of said phase conductors at the other of said reference locations along said cable to establish a field externally of the cable varying with the impulse flow on said one phase conductor, and a second switching means coupled to the others of said phase conductors at said other reference location for establishing return paths for said impulses over said other phase conductors to the signal generator means, said return paths being established at alternate time periods and for different time durations relative to each other to establish fields externally of the cable varying with the impulse flow on said other phase conductors, and means for locating the maximum fields around the periphery of the cable at said test point, including means for indicating the coded pulsing of each field as located.

3. An apparatus for simultaneously identifying a multi-conductor cable including a plurality of phase conductors and phasing the different conductors thereof in a single operation at a test point intermediate a pair of reference locations spaced apart along said cable, the conductors being intercoupled at one of said reference locations, comprising signal generator means including a first switching means for controlling the generation of impulses in a given cyclic sequence, coupling means for coupling said impulses to at least one conductor at the other of said reference locations along said cable for transmission thereover in a first direction to establish a field externally of the cable varying with said given cyclic sequence, and a second switching means operative to establish a return path for said impulses over at least one of the others of the conductors to said signal generator means in a second direction opposite to said first direction for only a portion of the period that the impulses are transmitted over said one conductor and establish another field externally of the cable varying with the impulse flow over said one other conductor, and means for locating the maximum fields established about the periphery of the cable at said test point including means for indicating the coded pulsing of each field as located.

4. An apparatus for simultaneously identifying a multi-conductor cable including a plurality of phase conductors and phasing the different conductors thereof in a single operation at a test point intermediate a pair of reference locations spaced apart along said cable, the conductors being intercoupled at one of said reference locations, comprising signal generator means including a first switching means for controlling the generation of impulses in a given cyclic manner, coupling means for coupling said impulses to one conductor at the other of said reference locations along said cable for transmission thereover in a first direction to establish a field externally of the cable varying in said given cyclic manner, a second switching means operative to establish return paths for said impulses over at least two others of the conductors to the signal generator means in a direction opposite to said first direction including means operative to establish a return path over a first one of the other conductors for a first time interval and means operative to establish a return path over a second one of the other conductors for a second time interval which is at a different time period and for a different length of time than said first time interval to establish additional fields externally of the cable varying with the impulse flow over said first one and said second one of the other conductors, and means for locating the maximum fields at point including means for indicating the value, direction, and coded pulsing of each of said fields.

5. An apparatus for simultaneously identifying a multi-conductor cable including a plurality of phase conductors and phasing the different conductors thereof in a single operation at a test point intermediate a pair of reference locations spaced apart along said cable, the conductors being intercoupled at one of said reference locations, comprising signal generator means for generating impulses in a given cyclic sequence, means coupled to said cable at the other of said reference locations for cyclically establishing two different paths for said impulses over at least a first and a second one of said conductors including a first switching means operative to cyclically establish a first impulse path over the first one of said conductors for certain periods of time and a second switching means for cyclically establishing a second impulse path over the second one of said conductors for other periods of time to establish fields externally of said cable varying with the impulse flow over said first and second conductors, the durations of the periods of time for the different impulse paths being different whereby one group of impulses of one total number is transmitted over said first conductor at one time period of each cycle and a different group of impulses of a different total number is transmitted over the second conductor at a different time period in each cycle, and means for detecting the location of the maximum fields at said test point and the identity of each field as indicated by the coded pulsing thereof.

6. An apparatus for simultaneously identifying an inaccessible multi-conductor covered cable including a plurality of phase conductors and phasing the different conductors thereof in a single operation at a test point intermediate a pair of reference locations spaced apart along said cable comprising signal generator means for generating impulses in a given cyclic manner, means for coupling said impulses to one conductor at one of said reference locations along said cable at timed, spaced intervals to establish a first field externally of the cable varying with the impulse flow over said one conductor, terminal coupling means for coupling said conductors to each other at the other of said reference locations, means in said signal generator means coupled to at least certain others of said conductors at said one reference location operative to establish return paths for said impulses over said terminal coupling means and said certain other conductors to said signal generator means including switching means operative to establish a first return path over a first one of said certain other conductors for a first given time period, and operative to establish a second return path over a second one of said certain other conductors for a second time period which occurs at a different time period and for a different length of time than said first time period to establish additional fields externally of the cable varying with the impulse flow over said first other and second other conductor, and means for locating the maximum fields about the periphery of the cable at said test point including means for indicating the location and coded pulsing of the fields.

7. An apparatus for simultaneously identifying a multi-conductor sheathed cable including a plurality of phase conductors and phasing the different conductors thereof in a single operation at a test point intermediate a pair of reference locations spaced apart along said cable, the conductors being intercoupled at one of said reference locations, comprising signal generator means for generating impulses in a given cyclic manner, coupling means for coupling said impulses to one conductor at the other of said reference locations along said cable to establish a field externally of the cable varying with the impulse flow over said one conductor, means in said signal generator means coupled to at least certain others of said conductors at said other reference location operative to establish return paths for said impulses over said certain other conductors to said signal generator means including switching means operative to cyclically establish the return paths over said other conductors at different times in the cycle relative to each other and for different periods of time relative to each other to establish additional fields externally of the cable varying with the impulse flow over said conductors, and field responsive means movable about the outer periphery of the cable sheath at said test point to indicate the location on the cable periphery of the maximum fields established by the impulses in the different conductors and the coded pulsing of each of said fields.

8. An apparatus for simultaneously identifying a multi-conductor cable including a plurality of phase conductors and phasing the different conductors thereof in a single operation at a test point intermediate a pair of reference locations spaced apart along said cable, the conductors being intercoupled at one of said reference locations comprising signal generator means including a capacitor discharge impulse transmitter operative to generate impulses in a given cyclic sequence, coupling means for coupling said impulses to one conductor of said cable at the other of said reference locations to establish a field externally of the cable varying with the impulse flow over said one conductor, means in said signal generator means coupled to at least certain others of said conductors at said other reference location operative to establish return paths for said impulses over said certain other conductors to said signal generator means including switching means operative to establish the return paths over the different ones of said other conductors at alternate times and for different periods of time relative to each other to establish additional fields externally of the cable varying with the impulse flow over said other conductors, and means including an inductive pick-up coil for locating the position of maximum strength of the pulse coded fields at said test point, electronic amplifier means for amplifying the field signals detected, and indicator means for indicating the values of the detected signals.

9. An apparatus for simultaneously identifying a multi-conductor cable including a plurality of phase conductors and phasing the different conductors thereof in a single operation at a test point intermediate a pair of reference locations spaced apart along said cable, the conductors being intercoupled at one of said reference locations, comprising signal generator means for generating impulses in a given cyclic sequence including signal storage means, means for coupling a source of potential signal to said signal storage means, means for periodically coupling said signal storage means to a discharge circuit including a motor unit, a first switching means controlled by said motor unit, and means controlled by said first switching means to couple the signal storage means to one of said conductors at the other of said reference locations at predetermined, spaced time intervals to establish a flow of impulses on said one conductor to establish a field externally of the cable varying with the impulse flow over said one conductor and second switching means coupled to at least certain others of said conductors controlled by said motor unit operative to establish return paths for said impulses over said certain other conductors to said signal generator means at alternate times and for different periods of time relative to each other to establish additional fields externally of the cable varying with the impulse flow over said other conductors, and means for determining the location of the maximum fields about the periphery of the cable and the coded pulsing of each of said fields as located at said test point.

10. The method of identifying a multi-conductor cable including a plurality of phase conductors and phasing the conductors thereof in one operation at a test point intermediate of a pair of reference locations which comprises the steps of intercoupling said conductors at one of said reference locations, establishing a flow of impulse signals over at least certain of the conductor members at the other of said reference locations according to a predetermined code to establish fields externally of the cable varying with the impulse flow over said certain conductors, the pattern of impulses for the different conductors of the cable being different at least in time, and exploring the periphery of the cable at a point intermediate said reference locations for the existence of the maximum fields and determining the identity of each conductor by the code pulsing of the fields as located.

11. The method of identifying a multi-conductor cable including a plurality of phase conductors and phasing the conductors thereof in one operation at a test point between a pair of reference locations along the cable which comprises the steps of intercoupling said conductors at one of said reference locations, coupling impulse signals to a first conductor member at the other of said reference locations in a cyclic manner to establish a related field externally of the cable, selectively establishing a return path for only predetermined ones of said impulse signals over a different one of the conductors to establish a pattern of impulses thereon which is different than the pattern on the first conductor to establish a field externally of the cable varying with the impulse signals on said different conductor, and exploring the cable with field detector means at the test point for the existence of the maximum fields and the code pulsing of each of the fields detected.

12. A method of identifying a multiconductor cable including a plurality of phase conductors and phasing the conductors thereof in one operation at a test point between a pair of reference locations along the cable which comprises the steps of intercoupling said conductors at one of said reference locations, cyclically establishing a flow over one of said conductors of a plurality of sets of impulses to establish a related field externally of the cable, each set being of a given number of impulses and spaced by a predetermined interval, establishing a flow of sets of impulses of a different number over a second conductor which sets have spaced intervals therebetween which are different than said first predetermined interval to establish another field externally of the cable, the periods of impulse transmission over the two conductors being different, and exploring a cable with field detector means at said test point for the existence of the maximum fields and the code pulsing of each of the fields detected.

13. An apparatus for identifying a given cable in a group of cables extending between a pair of reference locations, each of which cables includes at least one inner conductor and an outer sheath, comprising signal generator means for generating impulses in a given cyclic sequence, coupling means for coupling said impulses to the inner conductor of said given cable at one of said reference locations to establish a first field externally of said given cable, means connected at the other of said reference locations to establish a return path for said impulses to said signal generator means other than the initial path over said inner conductor and in a direction opposite thereto, and indicator means positioned for movement adjacent the cables of the group including field responsive means operative responsive to the positioning thereof between said reference locations near the cable sheath for the cable having said inner conductor which is conducting the impulse current to indicate the pulse code and the direction of the current flow in said inner conductor.

14. An apparatus as set forth in claim 13 in which said return path extends over the sheath of said given cable, and which includes means for connecting a short circuit path across a section of said sheath, whereby said indicator means as positioned adjacent said sheath responds only to the current flow in the inner conductor.

15. The method of identifying a given cable in a group of cables extending between first and second reference locations of the cable group, each of which cables includes at least one inner conductor and an outer sheath, which comprises the steps of coupling impulse signals to the inner conductor member of said given cable at one of said reference locations in a cyclic manner for transmission along the length thereof in a first direction, establishing a return path for the impulse signals in an opposite direction over a path other than said inner conductor member, and locating the cable of the group which has a pulsating field in accordance with said code and said first direction of current flow therein.

References Cited in the file of this patent

UNITED STATES PATENTS

| | | |
|---|---|---|
| 2,148,389 | Yonkers | Feb. 21, 1939 |
| 2,789,268 | Bechtel | Apr. 16, 1957 |